United States Patent
Pangrazio, III

(10) Patent No.: US 8,570,568 B2
(45) Date of Patent: Oct. 29, 2013

(54) WEB/CLOUD HOSTED PUBLISH AND SUBSCRIBE SERVICE

(75) Inventor: Donald M. Pangrazio, III, LeRoy, NY (US)

(73) Assignee: Xerox Corporation, Norwalk, CT (US)

(*) Notice: Subject to any disclaimer, the term of this patent is extended or adjusted under 35 U.S.C. 154(b) by 455 days.

(21) Appl. No.: 12/905,252

(22) Filed: Oct. 15, 2010

(65) Prior Publication Data

US 2012/0096399 A1 Apr. 19, 2012

(51) Int. Cl.
*G06F 3/12* (2006.01)
*G06F 3/048* (2013.01)

(52) U.S. Cl.
USPC .......................... 358/1.15; 358/402

(58) Field of Classification Search
USPC ............. 358/1.13, 1.14, 1.15, 402; 709/202, 709/203, 219
See application file for complete search history.

(56) References Cited

U.S. PATENT DOCUMENTS

| | | | |
|---|---|---|---|
| 6,032,004 A | 2/2000 | Mirabella, Jr. et al. | |
| 6,431,772 B1 | 8/2002 | Melo et al. | |
| 8,169,635 B2 * | 5/2012 | Kondo et al. | 358/1.15 |
| 2001/0017707 A1 * | 8/2001 | Lee | 358/1.12 |
| 2002/0138558 A1 | 9/2002 | Ferlitsch | |
| 2003/0123079 A1 * | 7/2003 | Yamaguchi et al. | 358/1.15 |
| 2003/0223089 A1 * | 12/2003 | Laursen et al. | 358/1.15 |
| 2005/0141018 A1 | 6/2005 | Oak et al. | |
| 2006/0023252 A1 | 2/2006 | Kanai | |
| 2008/0055627 A1 | 3/2008 | Ellis | |
| 2009/0100426 A1 | 4/2009 | Morales et al. | |
| 2009/0219563 A1 | 9/2009 | Morales | |
| 2009/0273800 A1 | 11/2009 | Morales | |
| 2010/0097632 A1 | 4/2010 | Hattori | |

* cited by examiner

*Primary Examiner* — Gabriel Garcia
(74) *Attorney, Agent, or Firm* — Gibb & Riley, LLC

(57) ABSTRACT

A subscription request is received from a user into a graphic user interface of a printing device to subscribe to a subject which is administered and published by a network hosted service. The printing device forwards the subscription request to a computerized device connected to the printing device through a computerized network. The computerized device is connected to a plurality of different printing devices. The printing device receives a printer-specific publication from the computerized device over the computerized network in response to the subscription request. The method stores the printer-specific publication within computer-readable memory of the printing device. The method may or may not receive a command from a user through the graphic user interface of the printing device before the printing device acts upon the specific publication (subject) received from the publishing device.

20 Claims, 5 Drawing Sheets

WEB/CLOUD HOSTED PUBLISH AND SUBSCRIBE SERVICE

BACKGROUND

Embodiments herein generally relate to network-based hosted services and more particularly to methods and systems that allow printing devices to subscribe to hosted services that are published to the printing devices.

With the emergence of cloud computing and hosted applications for user authentication and file repository access, printers such as multifunction printers can offer up files (titles) from any location to be printed at a local device.

SUMMARY

In one exemplary method embodiment herein, a subscription request is received from a user into a graphic user interface of a printing device to subscribe to a subject which is administered and published by a network hosted publish-subscribe service. Subject-Based Addressing is a way to tag information with a subject/topic name. To publish and subscribe information by subject name allows the content to decide where it needs to go based on the subject. A publishing system could publish different content to the same subject and all the same subscribing devices would receive each set of content in the order they were published. The subject does not define the content, it tells the system where the content needs to go. The publish/subscribe paradigm provides subscribers with the ability to express their interest in a subject or a sequence of subjects, in order to be notified afterwards of any subject published by a publisher, matching their registered interest. The basic system of publish/subscribe interaction relies on a subject notification service providing storage and management for subscriptions as well as efficient delivery of notifications. The printing device forwards the subscription request to a computerized device connected to the printing device through a computerized network. The computerized device is connected to a plurality of different printing devices. The printing device receives a printer-specific publication from the computerized device over the computerized network in response to the subscription request. The method stores the printer-specific publication within computer-readable memory of the printing device. The method acts on the subject which may include an operation and parameter. (Examples: Operation: Print, Parameter: Print Job, and Operation: Software Update, Parameter: Update data file). Some operations may require user confirmation or release from the printer's user interface (e.g., a secure print job).

In another method embodiment herein, a computerized device receives a subscription request to subscribe to a subject which is administered and published by a network hosted service from a printing device. The computerized device again is operatively connected to the printing device and to a plurality of different printing devices through a computerized network. The computerized device automatically sends a printer-specific publication to the printing device over the computerized network in response to the subscription request. Further, the computerized device automatically causes the printer-specific publication to be stored within computer-readable memory of the printing device. Also, the computerized device automatically causes the printer-specific publication to be acted upon or queue up for local user release or local user confirmation.

A printing device embodiment herein comprises a computer-readable memory operatively connected to (directly or indirectly connected to) a processor, a marking device operatively connected to the processor, a media path positioned to supply sheets of media to the marking device, a graphic user interface operatively connected to the processor, and a communications port operatively connected to the processor and to a computerized network external to the printing device. The graphic user interface receives a subscription request to subscribe to a subject which is administered and published by a network hosted service from a user.

Further, the communications port automatically forwards the subscription request to a computerized device connected to the printing device through a computerized network. Again, the computerized device is connected to a plurality of different printing devices. The communications port receives a printer-specific publication from the computerized device over the computerized network in response to the subscription request and the processor automatically stores the printer-specific publication within the computer-readable memory. The method may or may not receive a command from a user through the graphic user interface of the printing device before the printing device acts upon the specific publication (subject) received from the publishing device.

Another embodiment herein comprises a computerized device that includes a processor and a communications port operatively connected to the processor and to a computerized network external to the computerized device. The computerized device is operatively connected to a printing device as well as to a plurality of different printing devices through the computerized network. The communications port receives a subscription request to subscribe to a subject which is administered and published by a network hosted service from the printing device. In response to the subscription request, the communications port sends a printer-specific publication to the printing device over the computerized network. The processor causes the printer-specific publication to be stored within computer-readable memory of the printing device, and the processor causes the printer-specific publication to be provided by the printing device from the computer-readable memory in response to a user command.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

Figure 1:
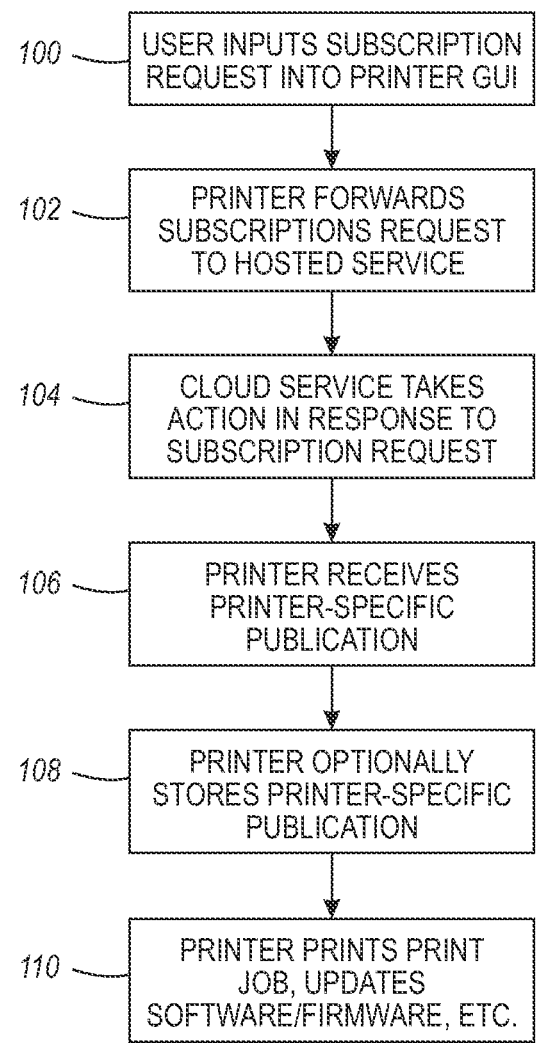
FIG. 1 is a flow diagram illustrating embodiments herein.

With the emergence of cloud computing and hosted applications for user authentication, utilizing on-printer interface technology, it is possible to directly connect the printer device to a hosted service in the web/cloud. From the printer device user interface an operator can subscribe the device to certain services (topics or subjects) that will be published or pushed directly to the printer from the cloud. In doing so, the subscribing device (through user menu selection) has expressed its membership to the topic or subject amongst those services the host provides (for the user account to which the user has been authenticated). This adds efficiencies to the printer device and the interactions that must take place at the printing device user interface.

The use of "publish and subscribe" allows for published content to be assigned to specific topics or subjects. Within databases subjects are predefined, and each user who, operating a potential receiving printing device, is interested in a subject expresses this interest by subscribing to the subject. Any service that publishes the subject is assured that all devices, which have been pre-subscribed by their users, will receive the data. This allows a service to share only the necessary data to the necessary devices.

The user subscribing at the printer would have a choice of specific topics or subjects to subscribe to through menu selections on the graphic user interface of the printing device. The services subscribed to using the embodiments herein could vary from secure/saved print jobs, standard print jobs, post-RIP raster image (i.e., marker engine ready, or print ready format) jobs, software upgrades, etc. In one use case, a subscription service maintains, in for example a database or other storage, all necessary software/firmware to keep a suite of subscribing devices at the same software release level. This configuration of software/firmware could become a subject that the subscription service publishes and to which a printer device could subscribe to. This makes the embodiments herein very useful for web based collaboration services interested in standardizing the devices its members are using.

Thus, with embodiments herein, in the use case where the subject or topic is a document, a printer device could be subscribed to a particular topic, which would result in the printer automatically having any subscribed subjects "published" to the printer device, so the publication is available locally at that printer for release. This may make sense for documents that are published on a scheduled release such as monthly reports, weekly meeting material, or even a one-time event such as a virtual user's conference. Further, web based collaboration services may provide the publish-subscribe service according to embodiments herein to its users. Distributed print solutions, IT departments, centralized pre-press departments are also examples of use cases for embodiments herein.

Thus, an operator can subscribe to certain services (topics or subjects) through the user interface of the printer device that will be published or pushed from the cloud. Examples of such subscription services include: to receive automatic software upgrades according to the "S/W Membership" to which it belongs; to receive a secure monthly print job; to receive a weekly print job; to receive meeting attachments; to receive a newsletter published by the web based collaboration service, etc.

Also, with embodiments herein, the use of multicast publishing rather than point-to-point transmission can sometimes be used to avoid potential network bottlenecks. When publishing documents, point-to-point communication may be sufficient, but when publishing larger items such as post-RIP raster images (i.e. marker engine ready), the option of multicast communication will avoid potential network bottlenecks. Multicast allows a one-to-many broadcast such that if printer devices are leaves on a tree, the data only traverses the trunk and braches once and only once to reach all of the leaves. The multicast feature is inherent to the publish-subscribe libraries used in the solution.

As shown, for example in item 100 in FIG. 1, in one exemplary embodiment herein a subscription request is received from a user into a graphic user interface of a printing device to subscribe to a subject which is administered and published by a network hosted service. For example, a user can select from among choices of different subscription items from a menu displayed on the graphic user interface. In item 102, the printing device forwards the subscription request to the hosted service that uses a computerized device. The hosted service's computerized device is connected to the printing device that made the subscription request and to a plurality of different printing devices.

In item 104, the hosted service responds to (complies with) the subscription request by taking action, such as registering (subscribing) the device to the subject such that the next time the subject is published the device will receive the content and, in item 106, the printing device receives a printer-specific publication from the computerized device over the computerized network in response to the subscription. This printer-specific publication can comprise almost any form of transmission, such as at least one printer-specific print job, printer-specific software/firmware updates, and/or printer-specific data transmissions, etc. Further, in item 106 new versions of the printer-specific publication can be sent by the hosted service's computerized device and received by the printing device at regular time intervals (daily, weekly, monthly, etc.). The method can optionally store the printer-specific publication within computer-readable memory of the printing device in item 108. The user then provides a command to the graphic user interface of the printing device, and the printing device provides the printer-specific publication from the computer-readable memory in response to the command (item 110) by printing the print job, updating software/firmware, etc. The method may or may not receive a command from a user through the graphic user interfact of the printing device before the printing device acts upon the specific publication (subject) received from the publishing device.

Figure 2:
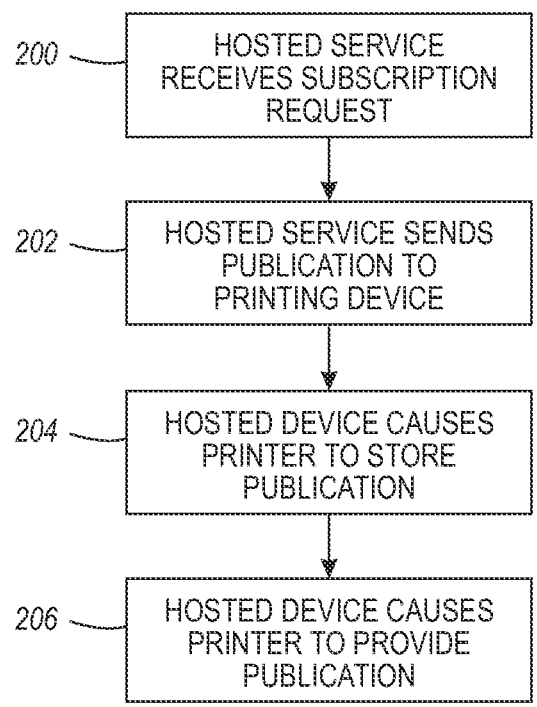
FIG. 2 is a flow diagram illustrating embodiments herein.

In another method embodiment, shown in item 200 in FIG. 2, a computerized device receives a subscription request to subscribe to a network hosted service from a printing device. As part of this process, the computerized device can, through various commands and software, cause choices of different subscription items to be displayed on a menu of a graphic user interface of the printing device. The computerized device again is operatively connected to the printing device and to a plurality of different printing devices through a computerized network. The hosted service responds to (complies with) the subscription request by taking action, such as registering (subscribing) the device to the subject such that the next time the subject is published the device will receive the content.

In item 202, the computerized device sends the printer-specific publication to the printing device over the computerized network in response to the subscription. This publication is made "printer-specific" by the hosted service's computerized device by selecting a form of publication that is compatible with the printing device that requested the subscription. For example, if the publication is a print job, the hosted service's computerized device selects a document format and job ticket type (from one or more databases maintained by or within the computerized device) so that the print job will be acceptable to the raster image processor and hardware components of the requesting printing device. Similarly, if the printer-specific publication is a software/firmware update or a data transmission, the hosted service's computerized device selects a software/firmware (again from one or more databases maintained by or within the computerized device) that is specific to the components of the requesting printing device.

Further, the computerized device can, through various commands and software, cause the printer-specific publication to be stored within computer-readable memory of the printing device in item 204. Also, the computerized device can, through various commands and software, cause the printer-specific publication to be provided (potentially at regular periodic intervals) by the printing device from the computer-readable memory in response to a user command in item 206.

Figure 3:
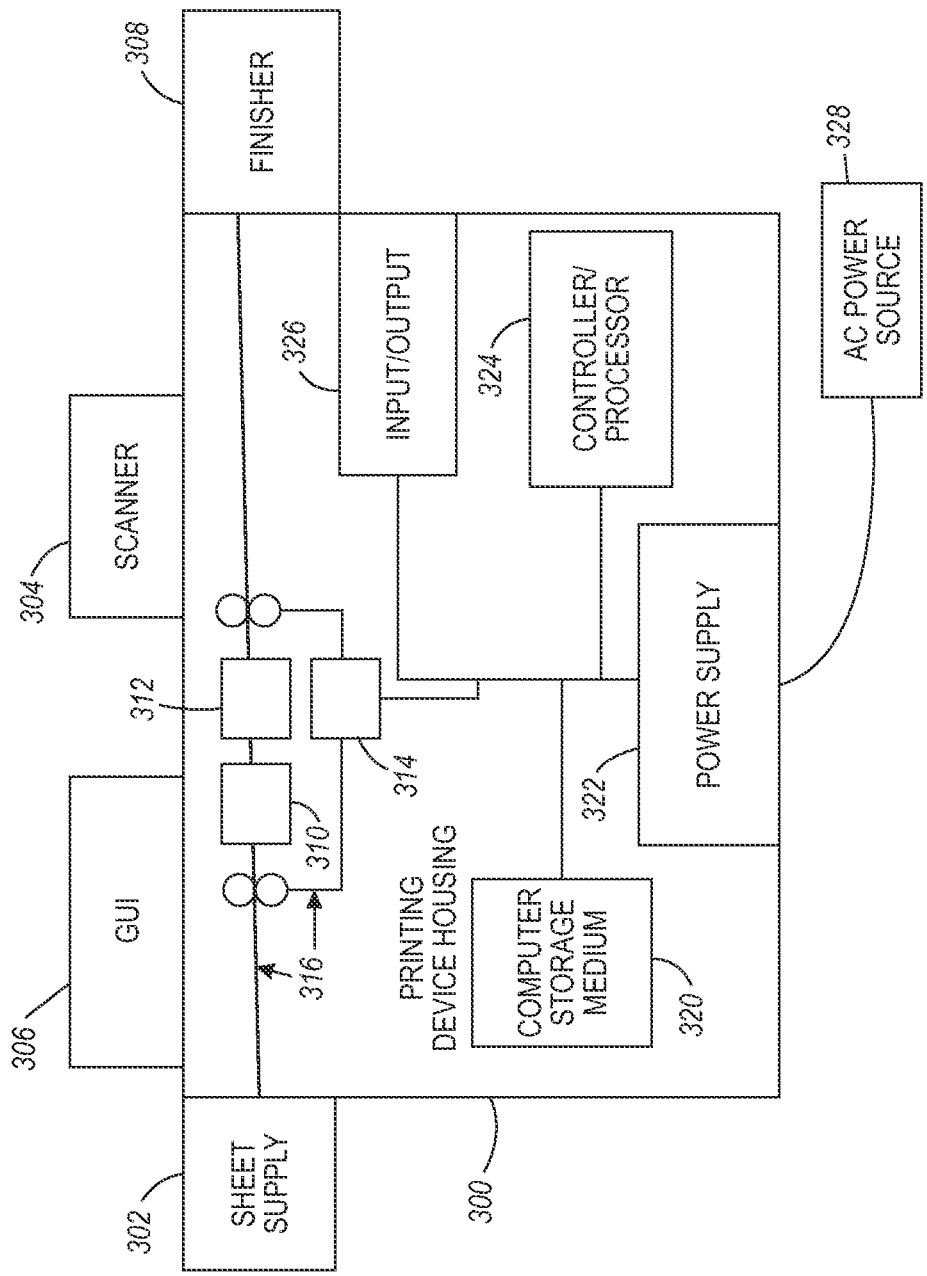
FIG. 3 is a side-view schematic diagram of a device according to embodiments herein.

A further embodiment illustrated in FIG. 3 comprises a printing device 300, which can comprise, for example, a printer, copier, multi-function machine, etc. The printing device 300 includes a controller/processor 324, at least one marking device (printing engine) 310, 312, 314 operatively connected to the processor 324, a media path 316 positioned to supply sheets of media from a sheet supply 302 to the marking device(s) 310, 312, 314, and a communications port (input/output) 326 operatively connected to the processor 324 and to a computerized network external to the printing device. After receiving various markings from the printing engine(s), the sheets of media can optionally pass to a finisher 308 which can fold, staple, sort, etc., the various printed sheets.

Also, the printing device 300 can include at least one accessory functional component (such as a scanner/document handler 304, sheet supply 302, finisher 308, etc.) and graphic user interface assembly 306 that also operate on the power supplied from the external power source 328 (through the power supply 322).

The input/output device 326 is used for communications to and from the multi-function printing device 300. The processor 324 controls the various actions of the printing device. A non-transitory computer storage medium 320 (which can be optical, magnetic, capacitor based, etc.) is readable by the processor 324 and stores instructions that the processor 324 executes to allow the multi-function printing device to perform its various functions, such as those described herein.

Thus, a printer body housing 300 has one or more functional components that operate on power supplied from the alternating current (AC) 328 by the power supply 322. The power supply 322 converts the external power 328 into the type of power needed by the various components.

Figure 4:
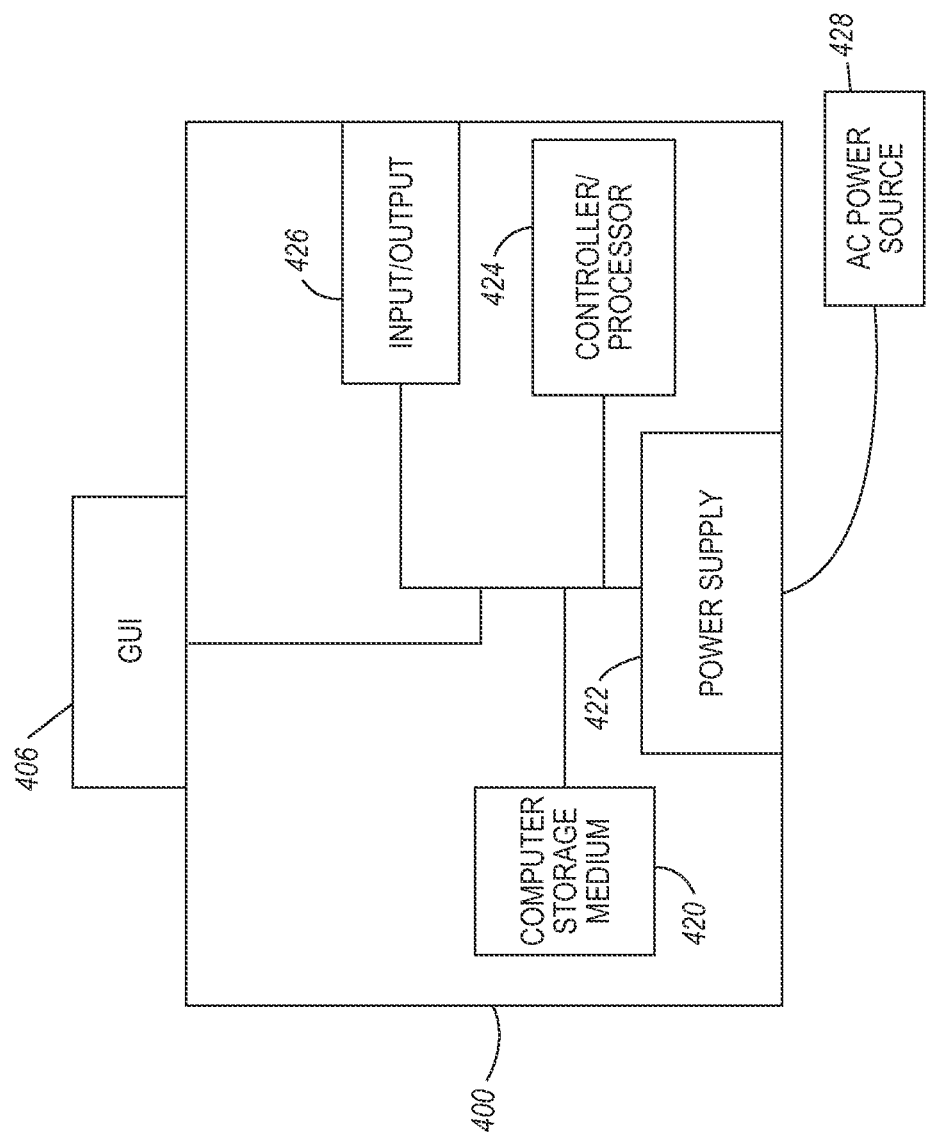
FIG. 4 is a side-view schematic diagram of a device according to embodiments herein.
Figure 5:
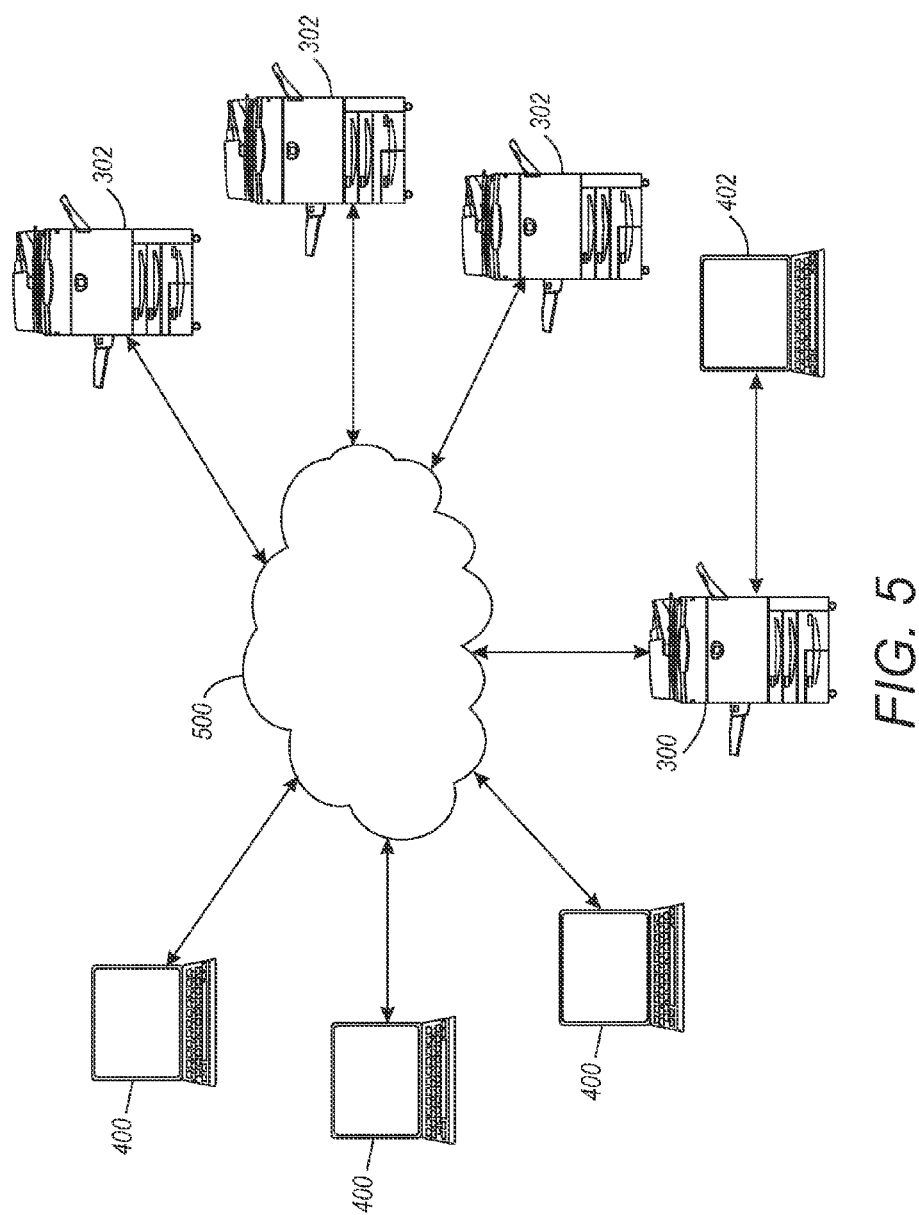
FIG. 5 is a schematic diagram of a system according to embodiments herein.

The graphic user interface 306 provides a menu to the user for subscription selection and the graphic user interface 306 receives, as input, a subscription request to subscribe to a subject which is administered and published by a network hosted service from the user. The communications port 326 forwards the subscription request to a computerized device connected to the printing device through a computerized network. The hosted service responds to (complies with) the subscription request by taking action, such as registering (subscribing) the device to the subject such that the next time the subject is published the device will receive the content. As shown in FIGS. 4 and 5, such a computerized device 400 can be connected to a plurality of different printing devices 302 through a computerized network 500.

The communications port 326 receives a printer-specific publication from the computerized device 400 over the computerized network 500 in response to the subscription and the processor 324 stores the printer-specific publication within the computer-readable memory. The graphic user interface 306 receives a command from a user, and the processor 324 provides the printer-specific publication from the computer-readable memory 320 in response to the command. The method may or may not receive a command from a user through the graphic user interface of the printing device before the printing device acts upon the specific publication (subject) received from the publishing device. The printer can receive the printer-specific publications one time or periodically by receiving a new version of the printer-specific publication at regular time intervals.

In some instances, when "providing" the printer-specific publication, the printing device 300 prints a print job using the marking device(s) 310, 312, 314. Alternatively, when "providing" the printer-specific publication, the printing device 300 can update software/firmware stored within any of the printer's components and/or the computer storage medium 320.

As would be understood by those ordinarily skilled in the art, the printing device 300 shown in FIG. 3 is only one example and the embodiments herein are equally applicable to other types of printing devices that may include less components or more components. For example, while a limited number of printing engines and paper paths are illustrated in FIG. 3, those ordinarily skilled in the art understand that many more paper paths and additional printing engines could be included within any printing device used with embodiments herein.

As shown in FIGS. 4 and 5, further embodiments herein comprise at least one computerized device 400 that includes a controller/processor 424, and a communications port (input/output) 426 operatively connected to the processor 424 and to a computerized network 500 external to the computerized device 400. The computerized device 400 is operatively connected to a printing device (such as printing device 300 discussed above) and to a plurality of different printing devices 302 through the computerized network 500. The other printing devices 302 have details similar to those shown in FIG. 3, but may use different raster image processors, different hardware and software protocols, etc.

The processor 424 can, through various commands and software, causes choices of different subscription items to be displayed on a menu of the graphic user interface 306 of the printing device 300. The computerized device 400 therefore may receive a subscription request to subscribe to a subject which is administered and published by a network hosted service from the printing device 300. The hosted service responds to (complies with) the subscription request by taking action, such as registering (subscribing) the device to the subject such that the next time the subject is published the device will receive the content.

In response to the subscription, the processor 424 searches databases (which can be located, for example, in the computer storage medium 420 or elsewhere within the Internet, cloud, or network 500) for items that comply with the subscription request. This publication is made "printer-specific" by the hosted service's controller 424 selecting a form of publication that is compatible with the printing device 300 that requested the subscription.

The communications port 426 sends (a single time or periodically) a printer-specific publication to the printing device 300 over the computerized network 500. The processor 424 can, through various commands and software, cause the printer-specific publication to be stored within computer-readable memory 320 of the printing device 300, and the processor 424 can, through various commands and software, cause the printer-specific publication to be provided (e.g., printed, software update, etc.) by the printing device 300 from the computer-readable memory 320 in response to a user command to the graphic user interface 306.

Further, the embodiments herein allow users to perform actions at remote locations. For example, the user could be at a location where they have do not have access to a workstation (and cannot connect their personal devices to a local network for security or other reasons). Because the embodiments herein can be invoked from the printing device user interface 306, the user can execute the embodiments herein directly from the printing device so as to still benefit from the embodiments herein without needing to utilize a workstation.

With embodiments herein, the user's experience is improved and simplified. By allowing the user to subscribe to hosted services, a single menu selection at the printer's user interface can provide the user with downloads of regular printed documents on topics of interest to the user. Further, such a single subscription can allow the user to rest assured that the components within the printing device will receive their required software and firmware updates automatically. In addition, by regularly storing such publications within the printer's memory, the user can decide when (and whether) to print items to which the user has subscribed, and the user can retrieve past issues of publications when necessary. Also, this subscription action can be performed directly through the graphic user interface of the printer, avoiding any complications that may exist with connections between the printer and the user's other computerized devices.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein cannot be implied or imported from any above example as limitations to any particular order, number, position, size, shape, angle, color, or material.

What is claimed is:

1. A method comprising:
    receiving a subscription request from a user into a graphic user interface of a printing device to subscribe to a network hosted service;
    forwarding, by said printing device, said subscription request to a computerized device connected to said printing device through a computerized network, said computerized device being connected to a plurality of different printing devices;
    receiving, by said printing device, a printer-specific publication from said computerized device over said computerized network in response to said subscription request;
    storing said printer-specific publication within computer-readable memory of said printing device;
    displaying, on said graphic user interface of said printing device, a menu of printer-specific publications stored within said computer-readable memory of said printing device; and
    providing, by said printing device, said printer-specific publication from said computer-readable memory based on user selection from said menu of printer-specific publications stored within said computer-readable memory of said printing device.

2. The method according to claim 1, said printer-specific publication comprising printer-specific software/firmware updates.

3. The method according to claim 1, said providing of said printer-specific publication comprising printing a print job.

4. The method according to claim 1, said receiving of said subscription request comprising a user selecting among choices of different subscription items from a menu of said graphic user interface.

5. The method according to claim 1, said receiving of said printer-specific publication comprising periodically receiving a new version of said printer-specific publication at regular time intervals.

6. A method comprising:
    receiving, by a computerized device, a subscription request to subscribe to a network hosted service from a printing device, said computerized device being operatively connected to said printing device and to a plurality of different printing devices through a computerized network;
    sending, by said computerized device, a printer-specific publication to said printing device over said computerized network in response to said subscription request;
    causing, by said computerized device, said printer-specific publication to be stored within computer-readable memory of said printing device;
    causing a menu of printer-specific publications stored within said computer-readable memory of said printing device to be displayed on a graphic user interface of said printing device; and
    causing, by said computerized device, said printer-specific publication to be provided by said printing device from said computer-readable memory based on user selection from said menu of printer-specific publications stored within said computer-readable memory of said printing device.

7. The method according to claim 6, said printer-specific publication comprising printer-specific software/firmware updates.

8. The method according to claim 6, said causing of said printer-specific publication to be provided comprising causing said printing device to print a print job.

9. The method according to claim 6, further comprising causing, by said computerized device, choices of different subscription items to be displayed on a menu of a graphic user interface of said printing device.

10. The method according to claim 6, said sending of said printer-specific publication comprising periodically sending a new version of said printer-specific publication to said printing device at regular time intervals.

11. A printing device comprising:
a processor;
computer-readable memory operatively connected to said processor;
a marking device operatively connected to said processor;
a media path positioned to supply sheets of media to said marking device;
a graphic user interface operatively connected to said processor; and
a communications port operatively connected to said processor and to a computerized network external to said printing device,
said graphic user interface receiving a subscription request to subscribe to a network hosted service from a user,
said communications port automatically forwarding said subscription request to a computerized device connected to said printing device through a computerized network,
said computerized device being connected to a plurality of different printing devices,
said communications port receiving a printer-specific publication from said computerized device over said computerized network in response to said subscription request,
said processor storing said printer-specific publication within said computer-readable memory,
said graphic user interface displaying a menu of printer-specific publications stored within said computer-readable memory, and
said processor providing said printer-specific publication from said computer-readable memory based on user selection from said menu of printer-specific publications stored within said computer-readable memory.

12. The printing device according to claim 11, said printer-specific publication comprising printer-specific software/firmware updates.

13. The printing device according to claim 11, said providing of said printer-specific publication comprising printing a print job using said marking device.

14. The printing device according to claim 11, said receiving of said subscription request comprising a user selecting among choices of different subscription items from a menu of said graphic user interface.

15. The printing device according to claim 11, said receiving of said printer-specific publication comprising periodically receiving a new version of said printer-specific publication at regular time intervals.

16. A computerized device comprising:
a processor; and
a communications port operatively connected to said processor and to a computerized network external to said computerized device,
said computerized device being operatively connected to a printing device and to a plurality of different printing devices through said computerized network,
said communications port receiving a subscription request to subscribe to a network hosted service from said printing device,
said communications port automatically sending a printer-specific publication to said printing device over said computerized network in response to said subscription request,
said processor automatically causing said printer-specific publication to be stored within computer-readable memory of said printing device,
said processor causing a menu of printer-specific publications stored within said computer-readable memory of said printing device to be displayed on a graphic user interface of said printing device, and
said processor automatically causing said printer-specific publication to be provided by said printing device from said computer-readable memory based on user selection from said menu of printer-specific publications stored within said computer-readable memory of said printing device.

17. The computerized device according to claim 16, said printer-specific publication comprising printer-specific software/firmware updates.

18. The computerized device according to claim 16, said causing of said printer-specific publication to be provided comprising causing said printing device to print a print job.

19. The computerized device according to claim 16, said processor causing choices of different subscription items to be displayed on a menu of a graphic user interface of said printing device.

20. The computerized device according to claim 16, said sending of said printer-specific publication comprising periodically sending a new version of said printer-specific publication to said printing device at regular time intervals.

* * * * *